United States Patent
Kreuzer

Patent Number: 5,085,463
Date of Patent: Feb. 4, 1992

[54] GAS BAG APPARATUS FOR PROTECTION AGAINST IMPACT

[75] Inventor: Martin Kreuzer, Neckarsulm, Fed. Rep. of Germany

[73] Assignee: Kolbenschmidt Aktiengesellschaft, Neckarsulm, Fed. Rep. of Germany

[21] Appl. No.: 668,802

[22] Filed: Mar. 7, 1991

Related U.S. Application Data

[63] Continuation of Ser. No. 428,149, Oct. 26, 1989, abandoned.

Foreign Application Priority Data

Nov. 1, 1988 [DE] Fed. Rep. of Germany ....... 3837086

[51] Int. Cl.$^5$ ............................................. B60R 21/26
[52] U.S. Cl. ..................................... 280/731; 280/743
[58] Field of Search ............... 280/743, 727, 732, 731; 296/901

[56] References Cited

U.S. PATENT DOCUMENTS

| | | | |
|---|---|---|---|
| 4,173,356 | 11/1979 | Ross | 280/743 |
| 4,325,568 | 4/1982 | Clark et al. | 280/731 |
| 4,382,626 | 5/1983 | Spooner | 296/901 |
| 4,536,008 | 8/1985 | Brown, Jr. | 280/743 |
| 4,568,581 | 2/1986 | Peoples, Jr. | 296/901 |
| 4,705,716 | 11/1987 | Tang | 296/901 |
| 4,830,401 | 5/1989 | Honda | 280/743 |

Primary Examiner—Kenneth R. Rice
Attorney, Agent, or Firm—Sprung Horn Kramer & Woods

[57] ABSTRACT

The gas bag apparatus for protection against impact is adapted to be integrated in the steering wheel or instrument board of motor vehicles end consists of the collapsed gas bag, the bowl-shaped generator carrier, which is connected to the gas bag and accommodates the solid-fuel-operated gas generator, and the covering, which is made of elastic plastic and covers the gas bag and is clipped to the generator carrier. In order to reduce the weight the generator carrier consists of thermoplastic which is reinforced with glass mats.

4 Claims, 1 Drawing Sheet

GAS BAG APPARATUS FOR PROTECTION AGAINST IMPACT

This application is a continuation of application Ser. No. 428,149, filed Oct. 26, 1989 now abandoned.

This invention relates to a gas bag apparatus for protection against impact, which apparatus is adapted to be integrated into the steering wheel or instrument board of motor vehicles and consists of the collapsed and inflatable gas bag, the bowl-shaped generator carrier which contains the solid-fuel-operated gas generator that is connected to the gas bag, and a covering, which consists of elastic plastic and covers the gas bag and extends over its rim and is clipped to the generator carrier, wherein the cover of the covering has exactly defined rated break lines and the covering comprises an annular peripheral frame, which is clipped to the generator carrier and is joined by a hinge to the cover sections which are defined by the rated break lines.

The carrying element of a gas bag apparatus for protection against impact is the generator carrier, which serves also to accommodate the gas bag and its retaining plate (flange plate). EP-AP-0 235 383 describes a gas bag apparatus which serves for protection against impact and comprises a pre-assembled unit with a generator housing, a base plate as a generator carrier, an inflatable gas bag, two gas generators and a covering for the gas bag, which covering has a rated break line. The gas bag apparatus for protection against impact disclosed in DE-C-35 44 704 comprises a housing, in which a gas generator is centrally accommodated, which is adjoined on two opposite sides by two containers, which are recessed from the surface of the gas generator. A gas bag comprises a bag ply which surrounds and is secured to the gas generator and another bag ply which is infolded toward the center line on two sides which are at right angles to the center plane. DE-A-36 30 685 discloses a gas bag apparatus which serves for protection against impact and in which the gas bag and the gas generator are accommodated in a bowl-shaped hub body of a steering wheel. The hub body comprises a central bore for receiving the steering column, which extends into the hub body. For this reason the gas generator is formed with a coaxial opening on its side which is adjacent to the steering wheel.

In those known gas bag apparatuses for protection against impact the generator carrier consists either of deep-drawable steel or, in order to minimize the weight, of aluminum. To provide the space required to accommodate the gas bag, relatively expensive deep drawing operations are required and usually reach the limits of the deep-drawability of the material which is employed.

SUMMARY OF THE INVENTION

It is an object of the invention to develop for the gas bag appartaus for protection against impact which has been described first hereinbefore a generator carrier which can be made with a relatively low expenditure to have a minimized weight and high strength values.

That object is accomplished in accordance with the invention in that the generator carrier consists of thermoplastic which is reinforced by glass mats and has been deformed by compression molding. That material affords the advantage that it has a relatively high strength and yet permits for large deformations. A further advantage resides in that the distribution of the woven glass fabric in the plastic remains unchanged in all directions so that unchanged physical properties will be ensured. This is accompanied by an almost constant impact strength at temperatures in the ranges which are of interest in motor vehicles.

In accordance with a further feature of the invention that portion which is adjacent to the steering wheel may be integrally formed with an outwardly bent rim and the covering may be clipped behind said rim, which can easily take up the forces which are exerted as the gas bag is inflated.

In accordance with a preferred feature of the invention the matrix of the thermoplastic which is reinforced by glass mats may particularly consist of polypropylene, polyamide and polybutylene terephthalate so that moduli of elasticity in excess of 5000 N/mm$^2$ can be achieved in conjunction with a flexural strength in excess of 60 N/mm$^2$.

The rim of the generator carrier is desirably so designed that it can readily take up peripheral forces in excess of 1600N.

The generator carrier designed in accordance with the invention is shown by way of example in the drawing and will be explained more in detail hereinafter.

BRIEF DESCRIPTION OF THE DRAWINGS

FIG. 4 is a view of the air bag mounted in the carrier.

FIG. 5 is a view of the carrier of FIG. 4 by itself.

DETAILED DESCRIPTION OF THE INVENTION

Figure 1:
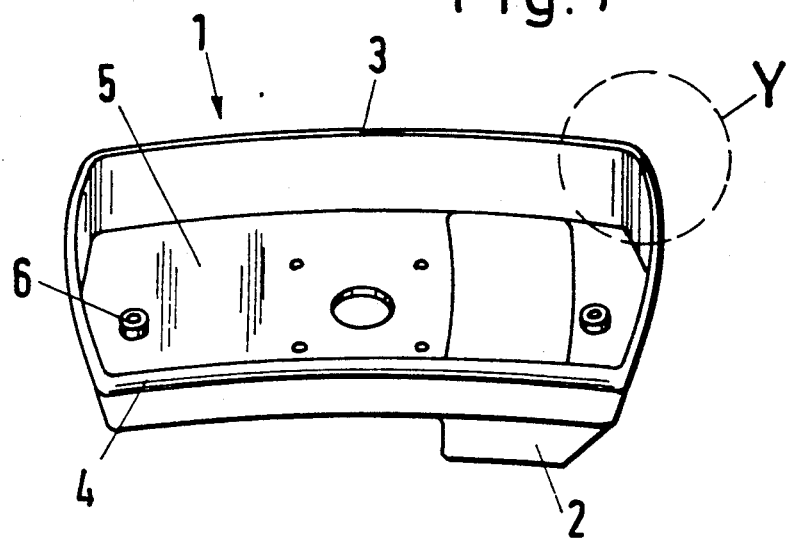
FIG. 1 is an isometric view of the carrier according to the invention.

FIG. 1 is a isometric view showing a bowl-shaped generator carrier 1, which has been compression-molded from a glass mat-reinforced thermoplastic, such as polypropylene, and serves to accommodate a gas bag which is folded parallel to the axis of the steering wheel and is received in a deep-drawn portion 2 (shown in the right-hand half of the drawing at 3) and also to accommodate a gas bag which is folded at right angles to the longitudinal axis (left-hand half of the drawing at 4). The fastening elements 6, such as nuts, which are required to secure the generator carrier 1 to the steering wheel have been inserted into the bottom 5 of the generator carrier 1.

Figure 2:
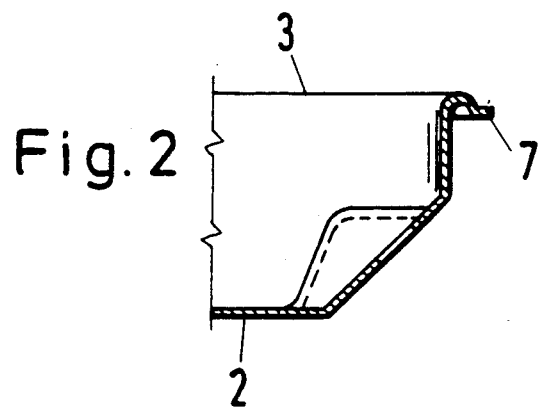
FIG. 2 is a detail of portion Y in FIG. 1.

FIG. 2 is a detail designated "Y" in FIG. 1 and indicates the outwardly bent, relatively wide rim 7 of the generator carrier 1. The covering is adapted to be clipped to that rim.

Figure 3:
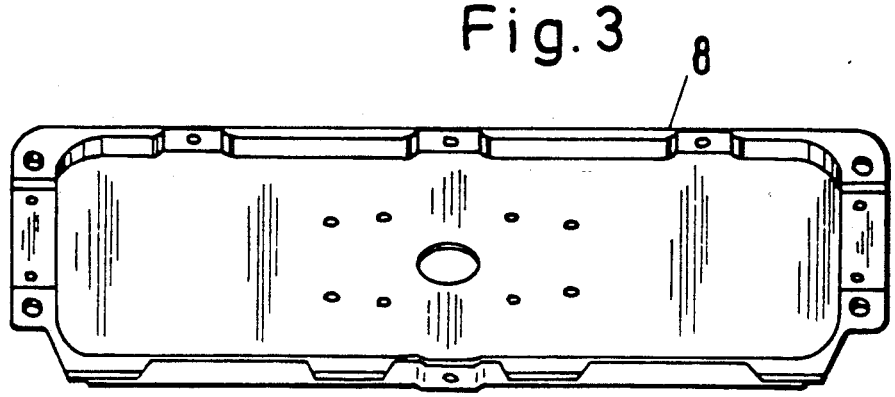
FIG. 3 is an isometric view of another embodiment of the carrier according to the invention.

FIG. 3 is an isometric view showing a generator carrier 8 for accommodating two gas generators and a gas bag which has a relatively large volume. That generator carrier can easily be made from thermoplastics which are reinforced by glass mats.

What is claimed is:

1. A carrier for an impact protection gas bag apparatus for integration into a motor vehicle, the carrier comprising: an integral member composed of thermoplastic material reinforced by glass mats, wherein the integral member has a bottom wall for mounting on a steering wheel, side walls extending upwardly from the bottom wall for enclosing a gas generator, a deep-drawn portion in the bottom wall configured to receive a folded gas bag connected to the gas generator and wherein the side walls have an uppermost portion facing away from the steering wheel when the carrier is mounted and on which a covering is disposed over the member, wherein the uppermost portion comprises a relatively wide circumferential rim extending from the side walls outwardly of the member and to which the covering is connected during use.

2. The carrier according to claim 1, wherein the rim has a downwardly disposed U-shaped cross section with a radially outwardly projecting portion extending therefrom.

3. The carrier according to claim 1, wherein the thermoplastic is polypropylene, polyamide or polybutylene terephthalate.

4. The carrier according to claim 1, wherein the rim takes up peripheral forces exceeding 1600N.

* * * * *